United States Patent [19]
Yoshihara et al.

[11] Patent Number: 5,926,748
[45] Date of Patent: *Jul. 20, 1999

[54] PORTABLE RADIO APPARATUS CAPABLE OF KEEPING ANTENNA AWAY FROM USER WHEN CALLING

[75] Inventors: Shigeo Yoshihara; Michio Nagai; Masaki Ichihara, all of Tokyo, Japan

[73] Assignee: NEC Corporation, Japan

[ * ] Notice: This patent is subject to a terminal disclaimer.

[21] Appl. No.: 08/276,332

[22] Filed: Jul. 15, 1994

[30] Foreign Application Priority Data

Jul. 23, 1993 [JP] Japan .................................. 5-183099
Sep. 3, 1993 [JP] Japan .................................. 5-243679

[51] Int. Cl.⁶ ...................................................... H04B 1/38
[52] U.S. Cl. .............................. 455/90; 455/575; 343/702
[58] Field of Search ................................ 455/89, 90, 97, 455/128, 129, 550, 575; 379/58, 59, 433, 428, 430; D14/138; 343/702, 880, 881, 883, 901, 903

[56] References Cited

U.S. PATENT DOCUMENTS

| | | | |
|---|---|---|---|
| 3,134,075 | 5/1964 | Langevin | 455/97 |
| 4,039,760 | 8/1977 | Gregory et al. | 379/58 |
| 5,079,558 | 1/1992 | Koike | 343/702 |
| 5,109,539 | 4/1992 | Inubushi et al. | 455/89 |
| 5,166,695 | 11/1992 | Chan et al. | 343/901 |
| 5,197,091 | 3/1993 | Takagi et al. | 455/90 |
| 5,214,434 | 5/1993 | Hsu | 343/702 |
| 5,218,370 | 6/1993 | Blaese | 343/702 |
| 5,260,998 | 11/1993 | Takagi | 379/433 |
| 5,271,684 | 12/1993 | Phillips | 343/882 |
| 5,336,896 | 8/1994 | Katz | 455/90 |
| 5,363,445 | 11/1994 | Shyu | 379/433 |
| 5,404,390 | 4/1995 | Tamura | 455/97 |
| 5,513,383 | 4/1996 | Tsao | 455/90 |

FOREIGN PATENT DOCUMENTS

| | | | |
|---|---|---|---|
| 508299 | 10/1992 | European Pat. Off. . | |
| 590671 | 4/1994 | European Pat. Off. . | |
| 603012 | 6/1994 | European Pat. Off. . | |
| 59-92629 | 5/1984 | Japan . | |
| 63-67032 | 3/1988 | Japan . | |
| A0213032 | 8/1989 | Japan | 455/89 |
| 403263957 | 11/1991 | Japan | 379/428 |
| 4-127723 | 4/1992 | Japan . | |
| 4152724 | 5/1992 | Japan | 379/58 |
| 404185038 | 7/1992 | Japan | 379/430 |

*Primary Examiner*—Thanh Cong Le
*Attorney, Agent, or Firm*—Ostrolenk, Faber, Gerb & Soffen, LLP

[57] ABSTRACT

A portable radio apparatus includes an antenna, a transceiver body having a receiver on an upper portion thereof and a transmitter on a lower portion thereof, and a mechanism for drawing out the receiver from the body to a side close to an ear of an operator. Also, in a portable radio apparatus including a transceiver body, a receiver provided in the body and an antenna provided on the body, the transceiver body is divided into a first unit including at least one receiver and a second unit coupled with the first unit, and the antenna is projected from the second unit.

10 Claims, 8 Drawing Sheets

PORTABLE RADIO APPARATUS CAPABLE OF KEEPING ANTENNA AWAY FROM USER WHEN CALLING

BACKGROUND OF THE INVENTION

The present invention relates to a portable radio communication apparatus, and more particularly to an antenna arrangement for a portable radio communication apparatus.

In a conventional typical portable radio apparatus, an antenna and a receiver are disposed on an upper portion of the portable radio apparatus body. In particular, the receiver is fixed to the portable radio apparatus body, and a transmitter is provided in a lower portion of the body. In such a conventional portable radio apparatus, since the receiver is brought in close contact with the ear when calling, the antenna inevitably approaches the human head.

Thus, during calls made with the antenna close to the human head, the radio waves transmitted from or received by the antenna are adversely affected by the head, as a result of which there arise such problems that the radiation pattern of the transmitted radio waves gets warped, radio waves transmitted from certain directions are difficult to receive, and the reception sensitivity is liable to deteriorate.

Conventionally, as a portable radio apparatus in which such problems are solved, there has been known a structure in which an antenna is disposed on a side portion or on a lower portion of the apparatus body, as shown in Japanese Laid Open Patent Application Nos. Sho 63-67032 and Hei 4-127723. Further, as a different type, there has been proposed a portable radio apparatus having a structure in which radio waves are not radiated in the vicinity of the head, as disclosed in Japanese Laid Open Patent Application No. Sho 59-92629.

SUMMARY OF THE INVENTION

An object of the present invention is to provide a novel portable radio apparatus which is capable of reducing the influence of the human head on radio waves transmitted from or received by an antenna as much as possible when calling.

The portable radio apparatus of the present invention has a mechanism for drawing a receiver away from a portable radio apparatus body to the human ear in order to keep the antenna away from the human head when calling. With such a structure, at the time of calling, when the receiver is drawn out from the portable radio apparatus body to the human ear side so as to be brought into contact with the ear, since the antenna is away from the head to a certain degree, the influence of the head on the radio waves transmitted from or received by the antenna is reduced.

Further, in the portable radio apparatus of the present invention, the antenna is capable of being drawn out from the back or the side of the body in order to keep the antenna away from the human head.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings.

DETAILED DESCRIPTION OF THE PREFERRED EMBODIMENTS

Figure 1A:
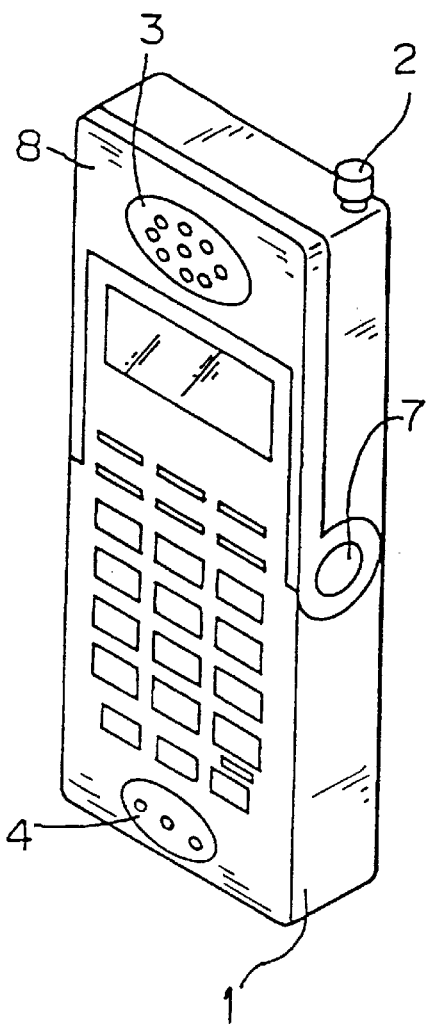
FIGS. 1A and 1B are perspective views showing a non-calling state and a calling state of a portable telephone in accordance with a first embodiment of the present invention, respectively.
Figure 1B:
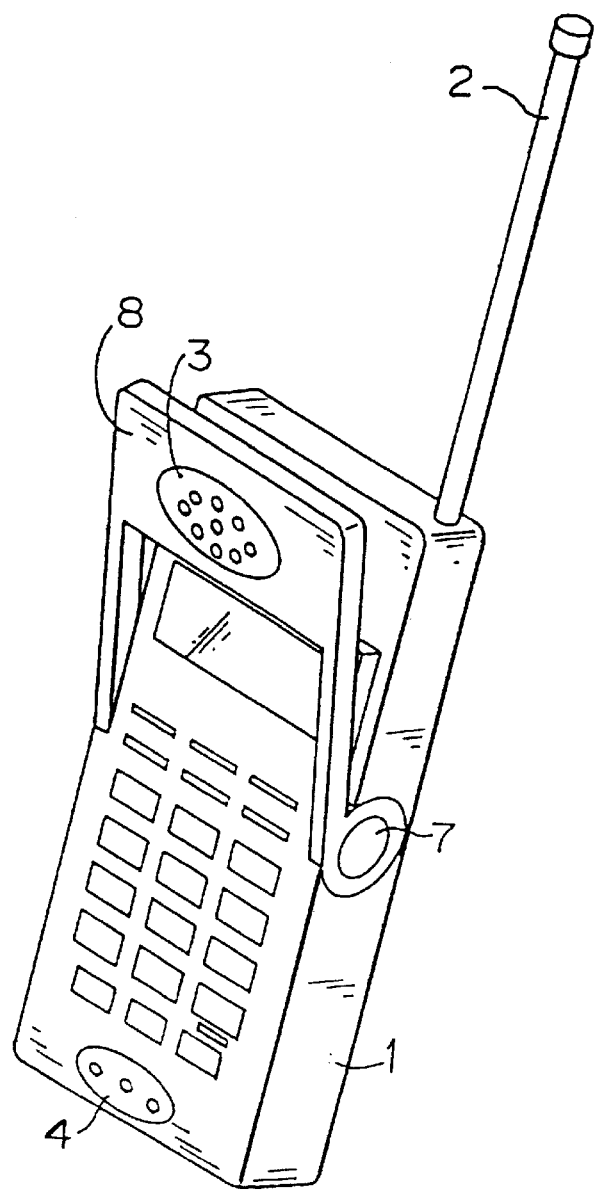

FIGS. 1A and 1B show, as an example of a portable radio apparatus, a portable telephone in accordance with a first embodiment of the invention in which an antenna 2 is withdrawably accommodated in a portable radio apparatus body 1. A receiving portion 8, also referred to as an earpiece, on which a receiver 3 is mounted is fitted by means of a hinge portion 7 to an upper portion of the body 1, and a transmitter 4, also referred to as a mouthpiece, is provided on a lower portion of the body 1. In a non-call state, the antenna 2 is accommodated in the portable telephone body 1, and also the receiver 8 is in close contact with the portable telephone body 1 so that the portable transceiver is compact. In a call state, as shown in FIG. 1B, the antenna 2 is drawn out from the portable telephone body 1, and the receiving portion 8 can be raised up from the portable telephone body 1 to the ear of the user by rotation of the hinge 7.

Figure 2:
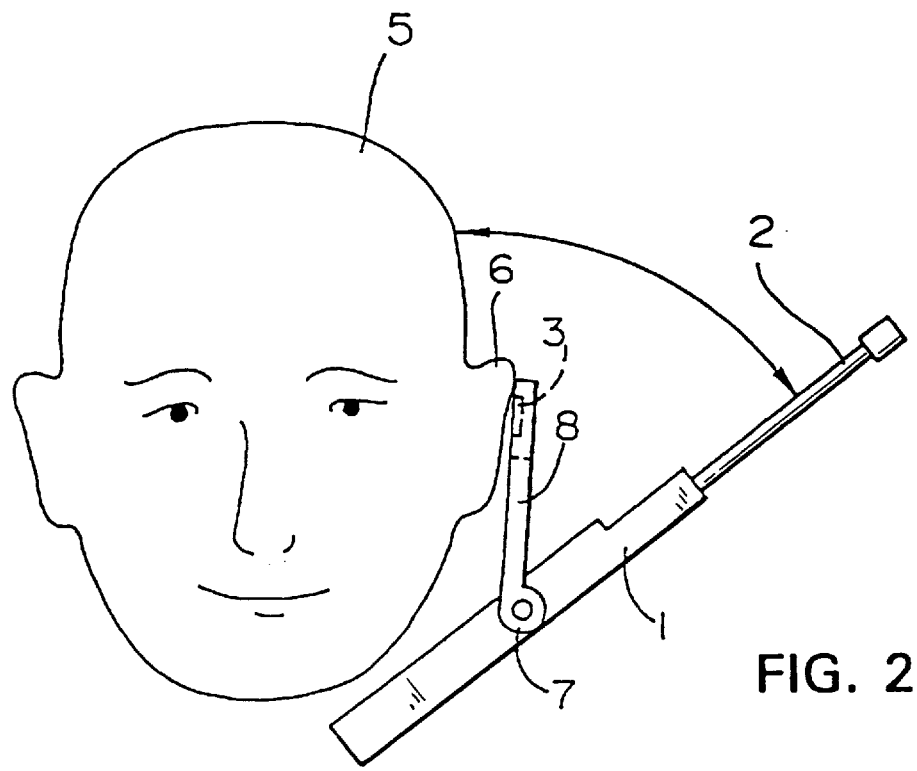
FIG. 2 is a diagram for explaining an operating state of the portable telephone in accordance with the first embodiment of the present invention.
Figure 3:
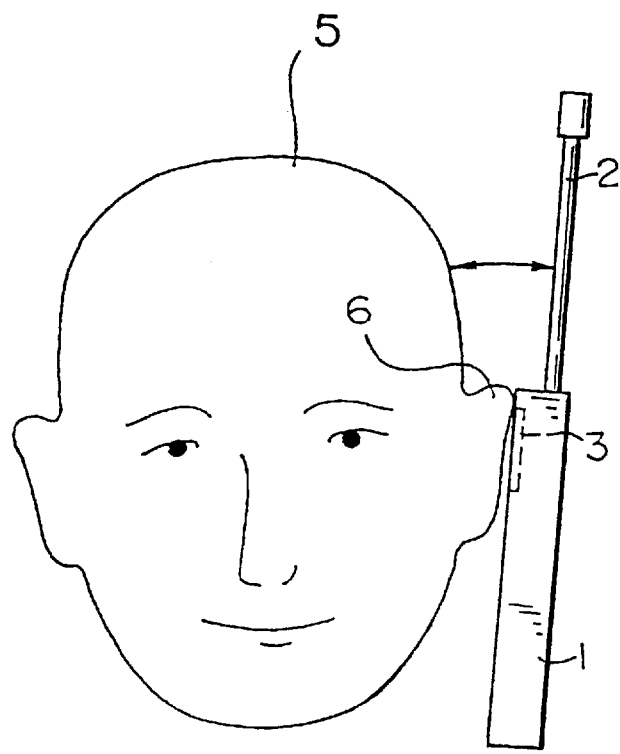
FIG. 3 is a diagram for explaining an operating state of a conventional portable telephone.

FIG. 2 is a diagram showing an operating condition of the portable telephone in accordance with the embodiment. As shown in the figure, when the receiver 3 of the body 1 is brought into close contact with the ear, the antenna 2 can be kept far apart from the head 5 of the user in comparison with a conventional operating condition shown in FIG. 3.

Figure 4A:
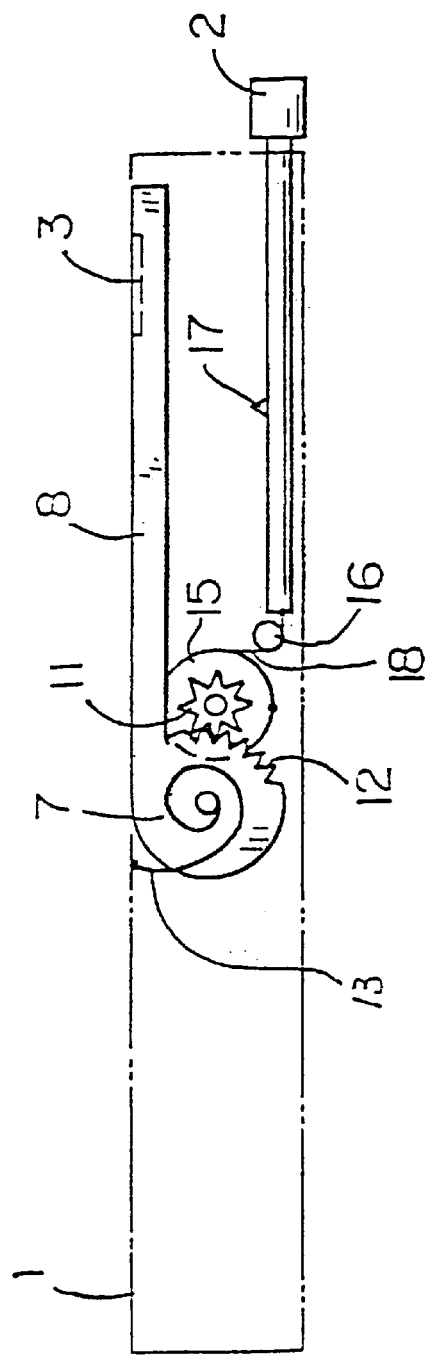
FIGS. 4A and 4B are diagrams showing a state where an antenna is accommodated in a portable telephone body and a state where the antenna is drawn out from the portable telephone body in the first embodiment of the present invention, respectively.
Figure 4B:
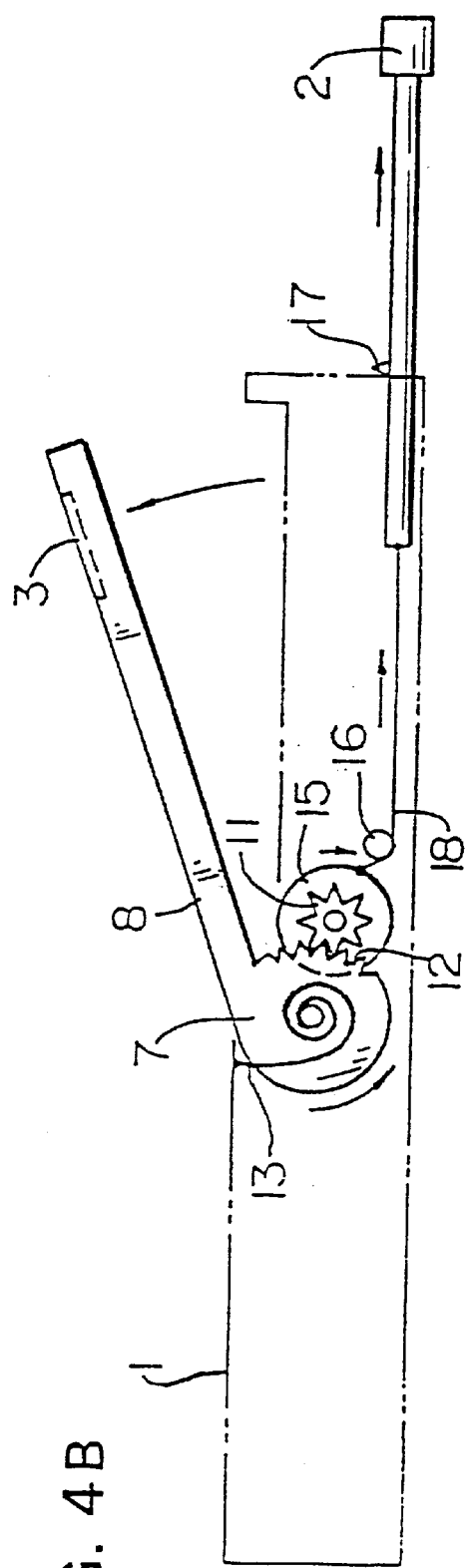

FIGS. 4A and 4B show an example of a mechanism in which, when the antenna 2 is drawn out from the portable telephone body 1 in a call state, the receiving portion 8 can be automatically moved away from the portable telephone body 1.

FIG. 4A shows a state in which the antenna 2 is accommodated in the portable telephone body 1, whereas FIG. 4B shows a state in which the antenna 2 is drawn out from the body 1. A cord 18 is attached to the end of the antenna 2 and wound on the periphery of a pulley 15 via a roller 16. A gear 11 is fixed to the pulley 15 which rotates with the gear 11, whereas a gear 12 which inter-locks the gear 11 is fixed to the receiving portion 8. A hinge 7 is provided on the receiving portion 8 in such a manner that the receiving portion 8 is rotated by rotation of the gear 12. A spiral spring 13 is fitted to the hinge 7 in such a manner that a clockwise rotational force is always exerted on the receiving portion 8 by the elastic force of the spiral spring 13 so that force is applied to the receiving portion 8 in the direction in which the receiving portion 8 is accommodated in the portable telephone body 1. A spring-like claw 17 for stopping the antenna 2 is disposed on the antenna 2 so that the antenna 2 is not retracted again when it is drawn out from the body 1.

In the portable telephone thus constituted, when the antenna 2 is drawn out, the cord 18 is drawn in the direction indicated by an arrow (see FIG. 4B), to thereby make the pulley 15 rotate in the direction indicated by an arrow. As a result, the gear 12 as well as the gear 11 rotates so that the hinge 7 which supports the receiving portion 8 is rotated against the clockwise rotational force applied by the spiral spring 13, whereby the receiving portion 8 is rotated so as to be move away from the body 1 and be raised up as shown in the FIG. 4B. When the antenna 2 has been drawn out, force is exerted on the antenna 2 in a direction in which the antenna 1 is drawn in. However, since the antenna 2 is stopped by the claw 17, the receiving portion 8 is also kept apart from the body 1.

Figure 5A:
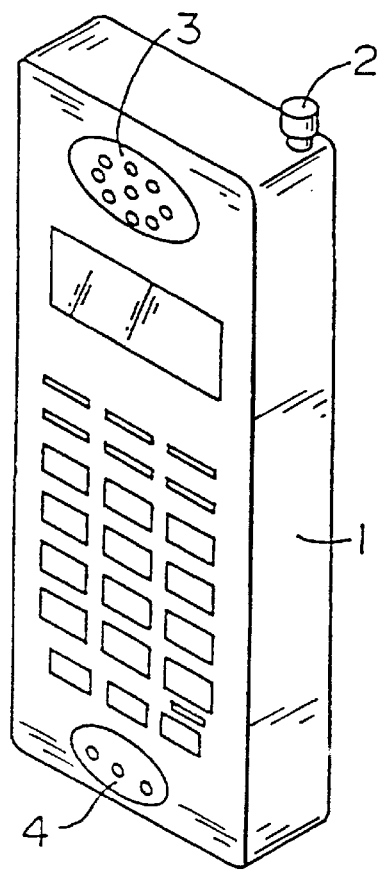
FIGS. 5A and 5B are diagrams showing a non-call state and a call state of a portable telephone in accordance with a second embodiment of the present invention, respectively.
Figure 5B:
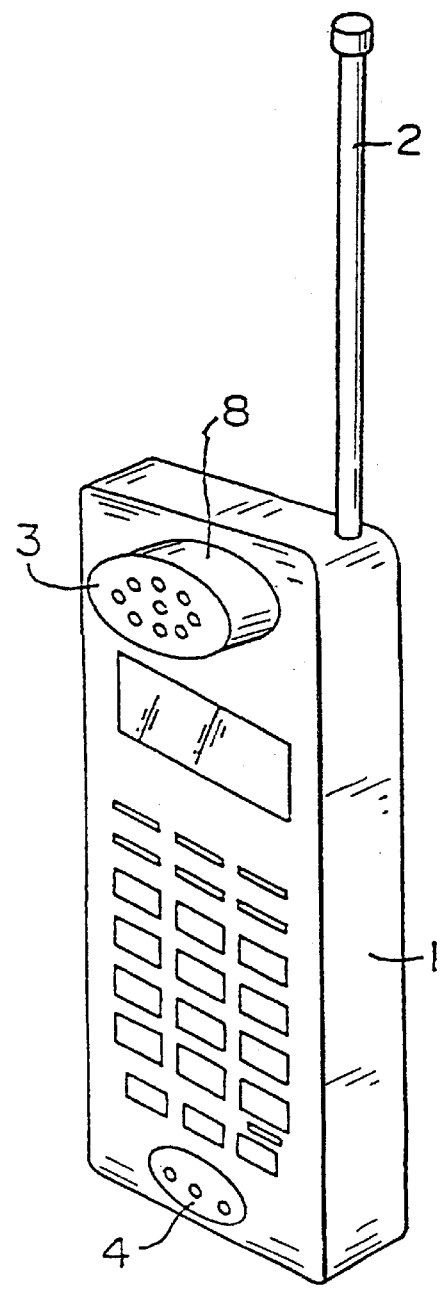

FIGS. 5A and 5B show a portable telephone in accordance with a second embodiment of the invention. In the figures, a portable telephone body 1 includes an antenna 2, a receiver 3 on an upper portion thereof, and a transmitter 4 on a lower portion thereof. In a non-call state, the antenna 2 is accommodated in the portable telephone body 1, and the receiver 3 is also accommodated in the portable telephone body 1 so that the portable telephone is made compact. On the other hand, in a call state, as shown in FIG. 5B, the antenna 2 is drawn out and a receiving portion 8 per se containing the receiver 3 therein projects from the portable telephone body 1, as shown in FIG. 5B. Therefore, when the receiver 3 is brought into close contact with an ear of an operator, since the upper portion of the portable telephone body 1 is moved away from the ear, the antenna 2 is also inevitably moved away from the head of the operator.

Figure 13A:
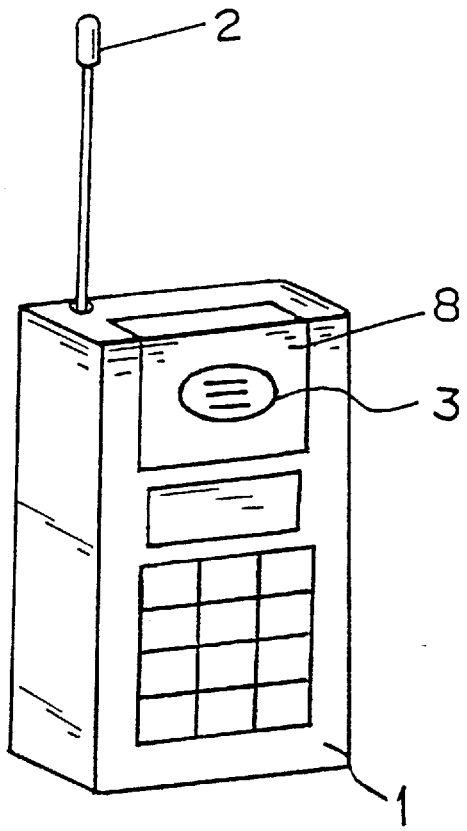
FIGS. 13A and 13B are diagrams showing a modification of the embodiment of FIGS. 5A and 5B.
Figure 13B:
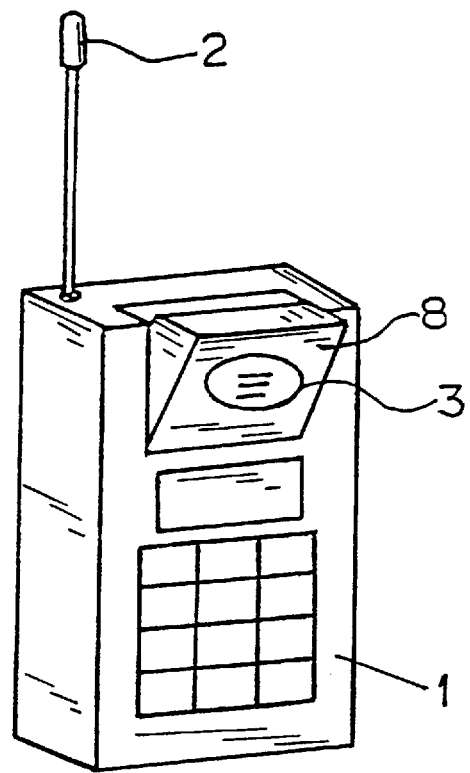

The receiving portion 8 may be modified as shown in FIGS. 13A and 13B. The receiving portion 8 shown in FIGS. 13A and 13B is fitted by means of a hinge to the body 1 so that it freely projects from the body 1.

In the second embodiment, the antenna 2 and receiver 3 may be drawn out by hand, and fixed with respect to the portable telephone body 1 by a spring-like claw. Alternatively, as in the mechanism of the first embodiment shown in the FIGS. 4A and 4B, there can be provided a mechanism in which the antenna 2 is drawn out to automatically project the receiver 3 from the portable telephone body 1 to the human ear.

Other embodiments will be described in which an antenna is drawn out from the back, the side or the like of a portable telephone body to remove the influence of the human head on the antenna.

Figure 6:
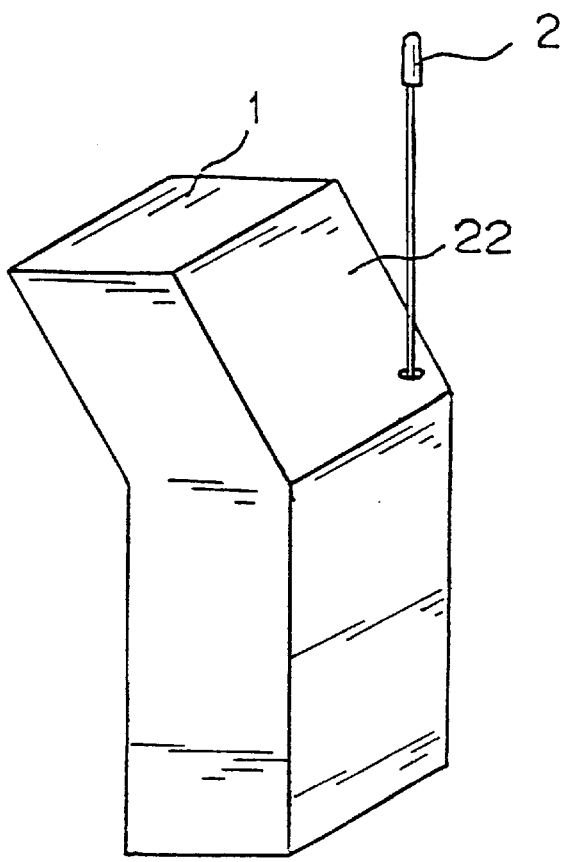
FIGS. 6 to 11 are perspective views showing a portable telephone in accordance with a third to an eighth embodiment of the invention, respectively.

Referring to FIG. 6, a portable telephone includes an antenna 2 which is constituted so as to project upward from a middle portion of a back surface 22 of a portable telephone body 1.

Figure 7:
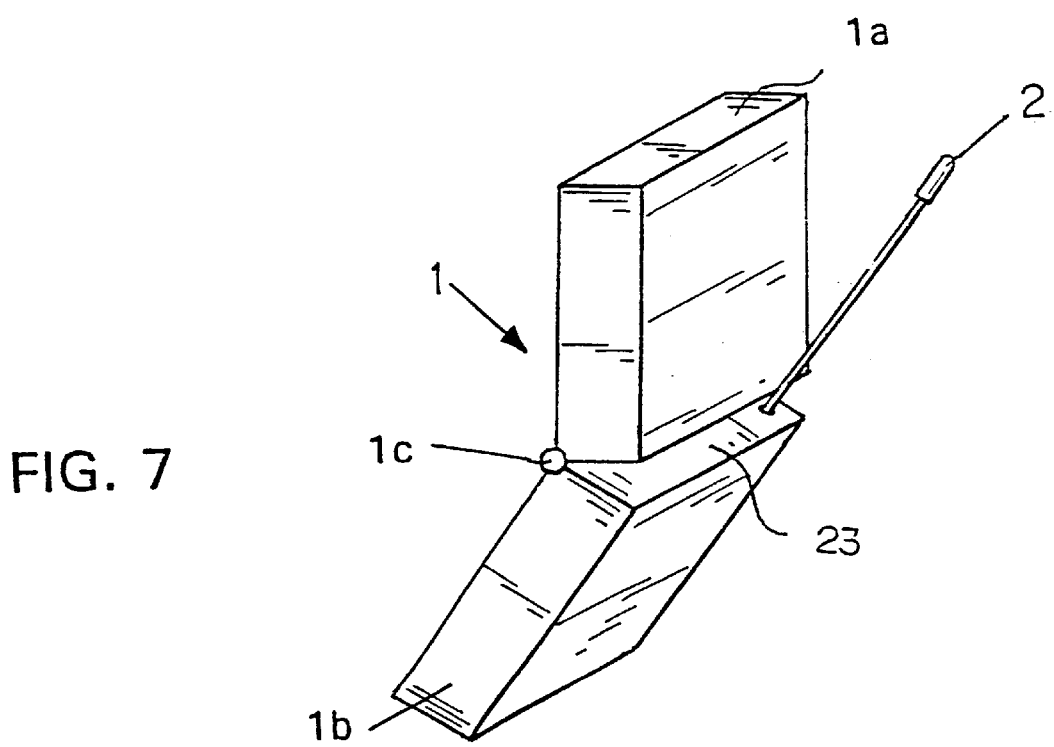

Referring to FIG. 7, a portable telephone comprises a portable telephone body 1 which is divided into a first unit 1a having a receiver and a second unit 1b having no receiver. The second unit 1b is connected to a lower portion of the first unit 1a through a folding portion 1c so as to be foldable. An antenna 2 is constituted so as to project from an upper surface 23 of the second unit 1b upward in a direction extending toward the first unit 1a.

Figure 8:
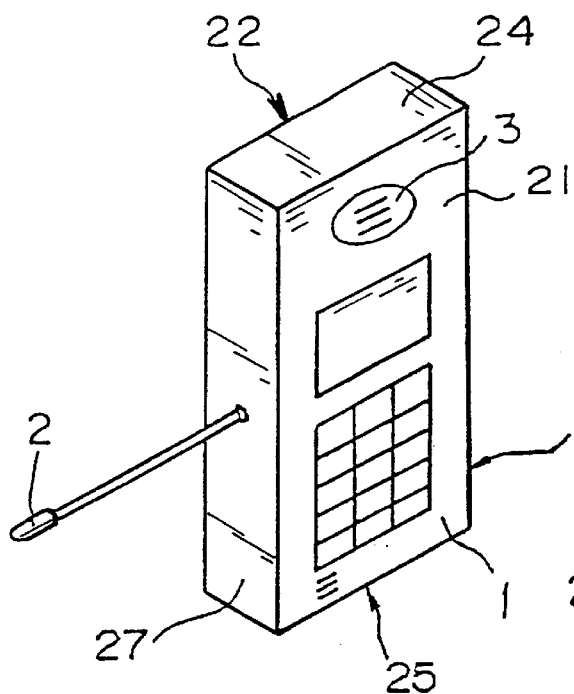

Referring to FIG. 8, a portable telephone is provided with a portable telephone body 1 which includes a front surface 21 having a receiver 3, a back surface 22 opposed to the front surface 21. The body 1 also includes an upper surface 24 which is nearest the receiver 3 among surfaces adjacent to the front surface 21 and the back surface 22, a bottom surface 25 opposed to the upper surface 24, one side surface 27 adjacent to the front surface 21, the back surface 22, the upper surface 24 and the bottom surface 25, and another side surface 28 opposite the side surface 27. An antenna 2 is constituted so as to project from the side surface 27 in a direction in which the antenna 2 moves away from the body 1.

Figure 9:
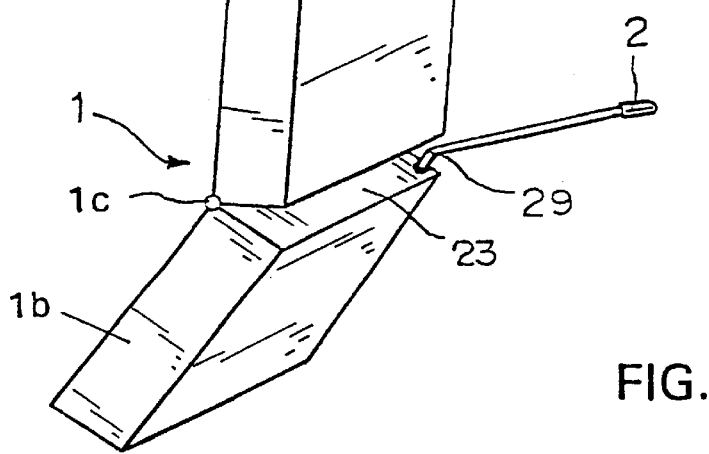

Referring to FIG. 9, as shown in FIG. 7, a portable telephone body 1 is divided into an upper unit 1a having a receiver and a lower unit 1b having no receiver. The lower unit 1b is foldably connected to a lower portion of the upper unit 1a through a folding portion 1c. An antenna 2 is constituted so as to project from the upper end surface 23 of the lower unit 1b. The antenna 2 has a folding point 29 in the vicinity of the lower unit 1b, at which the direction of projection of the antenna 2 is capable of being changed.

In the above-mentioned embodiments shown in FIGS. 6 to 9, the antenna 2 can be accommodated in the interior of the body 1.

Figure 10:
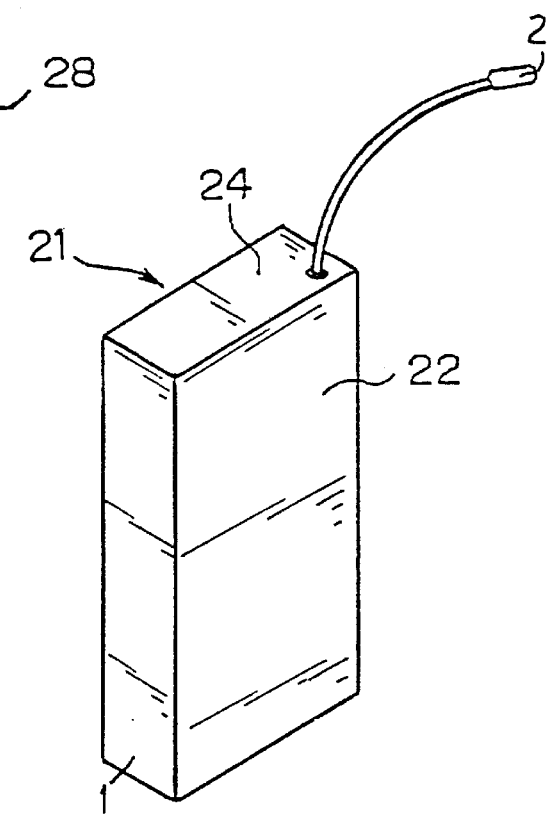
Figure 11:
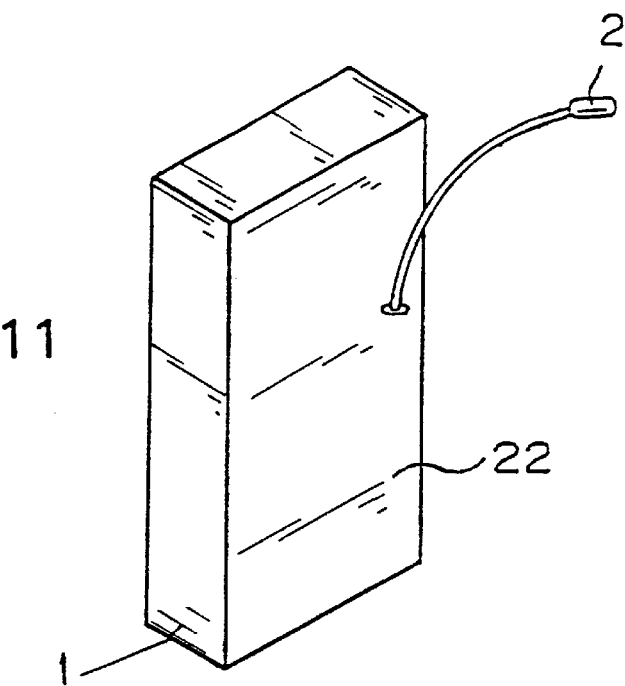

Referring to FIG. 10, a portable telephone body 1 includes a front surface 21 with a receiver, a back surface 22 opposed to the front surface 21, and an upper surface 24 which is nearest the receiver among surfaces adjacent to the front surface 21 and the back surface 22. An antenna 2 is previously formed in a curved shape so as to be bent in a direction in which the antenna 2 moves away from the receiver (front surface 21) when it is drawn, and projects from the upper surface 24 of the body 1. Further, as shown in FIG. 11, an antenna 2 may be projected from a middle portion of the back surface 22 of the portable telephone body 1.

Figure 12A:
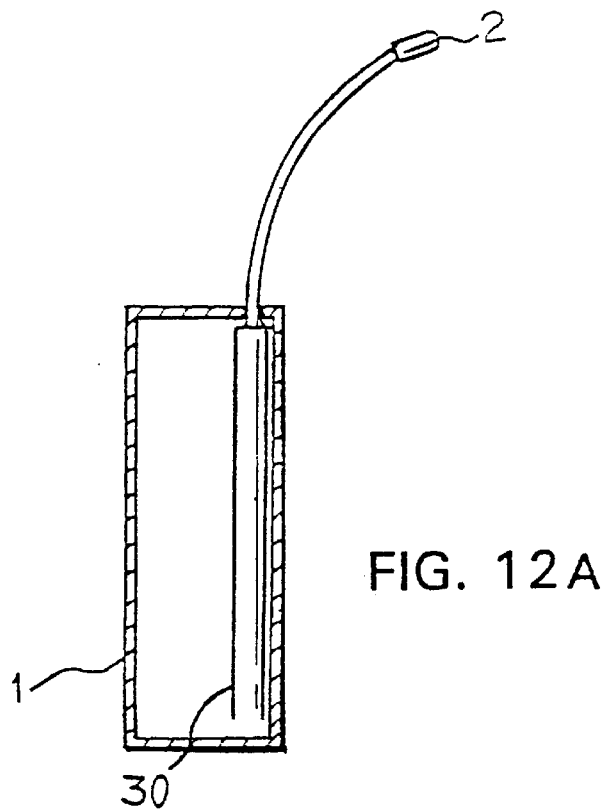
FIGS. 12A and 12B are diagrams showing a call state and a non-call state of a portable telephone in accordance with a ninth embodiments of the present invention, respectively.
Figure 12B:
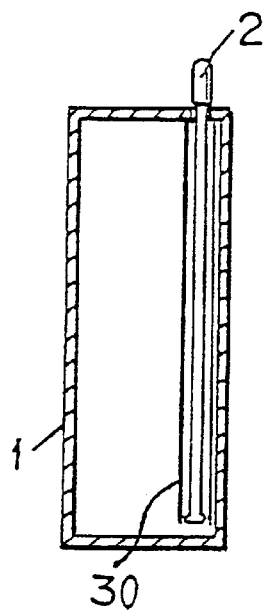

Further, as shown in FIG. 12A, in the case of the portable telephone shown in FIG. 10, the antenna 2 is in its preformed curved shape when the antenna 2 projects from the portable telephone body 1. On the other hand, when the antenna 2 is accommodated in the portable telephone body 1, as shown in FIG. 12B, the antenna 2 is inserted into a straight tube 30 disposed in interior of the body 1, thus being accommodated in the body 1. Also, the antenna 2 of the portable telephone shown in FIG. 11 is accommodated in the body 1 in the same manner.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A portable radio apparatus, comprising:

a body;

an antenna provided at an upper portion of said body;

an earpiece hingedly coupled to said body;

a mouthpiece provided at a lower portion of said body, wherein said earpiece is movable between a first position
wherein said earpiece is substantially flush with a front of said body, and a second position wherein said earpiece is angularly rotated away from a top of said antenna towards said mouthpiece, so that during normal use with the earpiece positioned in the vicinity of an operator's ear, a head of said operator will be positioned farther from said antenna top when said earpiece is in said second position than when said earpiece is in said first position.

2. A portable radio apparatus according to claim 1, wherein said earpiece is hingedly coupled to said body at approximately the middle of said body.

3. A portable radio apparatus according to claim 1, wherein said earpiece is hingedly coupled to said body on opposing sides of said body.

4. A portable radio apparatus according to claim 1, wherein said portable radio apparatus is in a non-call state when said earpiece is in said first position, and said portable radio apparatus is in a call state when said earpiece is in said second position.

5. A portable radio apparatus according to claim 1, wherein said antenna is retractable into said body.

6. A portable radio apparatus according to claim 1, wherein a surface of said earpiece and a surface of said body comprising said mouthpiece form a plane-like surface when said earpiece is in said first position.

7. A portable radio apparatus, comprising:
a body;
an antenna provided at an upper portion of said body;
an earpiece hingedly coupled to said body and retractable into said body;
a mouthpiece provided at a lower portion of said body,
wherein said earpiece is movable between a first position wherein said earpiece is substantially flush with a front of said body, and a second position wherein said earpiece is angularly rotated away from a top of said antenna towards said mouthpiece, so that during normal use with the earpiece positioned in the vicinity of an operator's ear, a head of said operator will be positioned farther from said antenna top when said earpiece is in said second position than when said earpiece is in said first position.

8. A portable radio apparatus according to claim 7, wherein said portable radio apparatus is in a non-call state when earpiece is in said first position, and said portable radio apparatus is in a call state when said earpiece is in said second position.

9. A portable radio apparatus according to claim 7, wherein said antenna is retractable into said body.

10. A portable radio apparatus according to claim 7, wherein a surface of said earpiece and a surface of said body comprising said mouthpiece form a plane-like surface when said earpiece is in said first position.

* * * * *